United States Patent [19]
Platter

[11] 3,947,887
[45] Mar. 30, 1976

[54] TRANSDUCER HEAD CONTOUR AND METHOD OF GENERATING SAME

[75] Inventor: Sandford Platter, Boulder, Colo.

[73] Assignee: Storage Technology Corporation, Louisville, Colo.

[22] Filed: Apr. 3, 1975

[21] Appl. No.: 564,682

[52] U.S. Cl. .................... 360/103; 29/603; 51/326; 360/122
[51] Int. Cl.² ........................................ G11B 15/64
[58] Field of Search ............. 29/603; 360/103, 122; 51/326, 281 R, 289 R, DIG. 5, DIG. 14

[56] References Cited
UNITED STATES PATENTS

| | | | |
|---|---|---|---|
| 3,648,361 | 3/1972 | Yagi et al. | 29/603 |
| 3,821,813 | 6/1974 | Freeman et al. | 360/103 |
| 3,846,906 | 11/1974 | Case | 29/603 |

*Primary Examiner*—Carl E. Hall
*Attorney, Agent, or Firm*—Woodcock, Washburn, Kurtz & Mackiewicz

[57] ABSTRACT

A head assembly for reading and writing data upon the magnetizable surface of passing tape. In its initial form the contour of the head comprises four bearing areas separated by three grooves or depressions. The outboard two of the four bearing areas are defined by a pair of contiguous, arcuate surfaces which blend into ramps which extend from opposing sides of the areas. The inboard pair of bearing surfaces each surround and are flush with the ends of a plurality of magnetic transducers adapted to be inductively coupled to a length of magnetic tape passing over the head surfaces. The inboard bearing surfaces are each formed by a major, centrally-disposed arc with second and third contiguous arcuate surfaces located at both ends of the central arc.

The above-described contours are initially formed in the head assembly by grinding according to conventional methods. The contours are then modified by lapping with an abrasive tape having predetermined characteristics in accordance with specified procedure to produce a surface which will maintain the stability of the hydrodynamic bearing existing between the tape and the head, and thus the consistency of the separation therebetween, when the tape is accelerated in a reverse direction. The consistent separation thus achieved assures the detection of information on the tape during periods of reverse acceleration.

13 Claims, 4 Drawing Figures

TRANSDUCER HEAD CONTOUR AND METHOD OF GENERATING SAME

BACKGROUND OF THE INVENTION

The present invention relates to magnetic transducer assemblies, and more particularly to the surface configuration of magnetic heads adapted to read or write information upon a passing magnetic tape.

The principle of placing information upon a moving magnetizable surface, and subsequently deriving the information therefrom, has been utilized for many years in various types of apparatus. Paramount among these is the computer, which makes use of magnetizable tape for storing and recording information in digital form. Typically, the recorded signals take the form of small areas of tape surface, the microscopic magnetic domains of which have been reoriented to form a magnetized area of one of two polarities. As the tape is transported by a reading mechanism these areas are sensed and a digital "1" or "0" is inferred. By appropriately combining the digital signals in a manner now well known to those skilled in the art vast amounts of information can be stored in a relatively small volume.

In order to derive blocks of digital information from a length of magnetic tape, a tape transport apparatus is required to accelerate the tape to a working velocity, transport the tape past an appropriate read or write transducer, and then bring the tape to a halt. Since the area of tape required for blocks of information may be relatively small, it will be appreciated that relatively high rates of acceleration and deceleration are needed in order to keep the unused area of tape to a minimum. Thus, it is highly desirable to be able to accelerate the magnetic tape medium to a working velocity as quickly as possible. Further, since it is often desired to read or write signals in the reverse direction, the system must also have the capability of accelerating the tape in the reverse as well as the forward direction.

One problem which has plagued prior art tape transport systems, particularly those in which the rate of acceleration of the transported tape was relatively high, is a temporary instability in tape position which arises upon reverse acceleration thereof. It has long been recognized that in rapidly transporting a length of foil, such as magnetic tape, over a bearing surface a hydrodynamic effect occurs wherein a thin layer of air forms between the tape and the bearing surface. The thickness of this gap, or layer of air, varies with tape speed and bearing surface characteristics. In order to take advantage of this effect, attempts are commonly made to provide a tape drive head with a surface or bearing configuration which supports a consistent gap between the tape and the head surface.

While this desideratum has been achieved in varying degrees in prior art systems, the theory which explains both steady-state and transient characteristics of the hydrodynamic bearing is neither fully developed nor completely understood. The contours of many head designs, while performing acceptably under many conditions, nonetheless support a transient instability when te transported tape is accelerated in a reverse direction. While the specifics of the phenomenon are not completely understood it appears that, at least with some head configurations, the tape bulges away from the head surface at some point while undergoing acceleration in the reverse direction. In a single capstan drive system wherein a capstan in effect "pushes" the tape across the head during reverse drive mode, a temporary lessening of tape tension occurs during the reverse acceleration period. The lessened tension and the drag forces acting on the tape give rise to a momentary outward bulging of the tape surface, away from the head surface. In cases where the aforementioned bulge occurs adjacent the reading or writing transducer an increased separation occurs between the tape and the transducer surface. The separation then continues until the system stabilizes, usually some time after the desired terminal velocity of the tape is achieved.

Since information is transferred to and from the magnetizable areas on the tape by means of inductive coupling with ones of the transducers in the head, the proximity of the tape to the head is critical. It will be understood that, as the separation between the tape and heads increases a severe lessening of the lines of magnetic flux linking the transducer and tape areas occurs with an accompanying probability that information will be incompletely transferred between head and tape. Should the separation become great enough, no information will be transmitted to or from the tape and the information comprising the initial portions of the block of information to be transmitted will be lost.

With the advent of improved tape compositions capable of being magnetized in smaller areas, and therefore of encoding information in a much higher density than previously, the criticality of coupling between the tape and tranducers is increased still further. Transient separations occurring at the beginning of a block of information, and which may have been tolerated in the past, can be sufficient to vitiate the entire block where densely packed information is present on the tape. For all of the foregoing reasons, it should be understood that it would be highly desirable to provide a tape transducer head assembly having a contour which does not support transient increases in tape-to-head gap during accelerative intervals of tape transport.

It is therefore an object of the present invention to provide a transducer head for interacting with magnetic tape which produces only insignificant, if any, increased separation during tape reverse acceleration.

It is another object of the invention to provide a method for forming the bearing surfaces of an improved magnetic tape transducer which will substantially preclude undue separation between the tape and transducer surface during reverse acceleration of the tape.

Summary of the Invention

Briefly stated, in accordance with one aspect of the invention the foregoing objects are achieved by providing a head assembly comprising four upstanding bearing areas separated by three grooves or depressions. The outboard bearing areas comprise elongate ramps which extend inwardly to contiguously meet first arcuate surfaces generated by a relatively large radius, and then second arcuate surfaces having radii of 0.015 inches or less. The inboard pair of bearing areas are initially formed in an essentially symmetrical manner, each area comprising a central arcuate surface generated by a radius of 0.5 to 0.7 inches. The central surface is flanked by second arucate surfaces having radii of substantially 0.10 to 0.18 inches, and terminating in third arcuate surfaces generated by radii of 0.015 inches or less.

The gap between the inboard and outboard bearings last encountered by a forward moving tape is large enough to facilitate the hydrodynamic action of the bearings, but small enough to prevent buckling of the tape bridging the bearings during reverse acceleration conditions. The above-described initial configuration is then modified by drawing lengths of fresh and used abrasive lapping tape thereover in both the forward and reverse directions in a prescribed manner.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
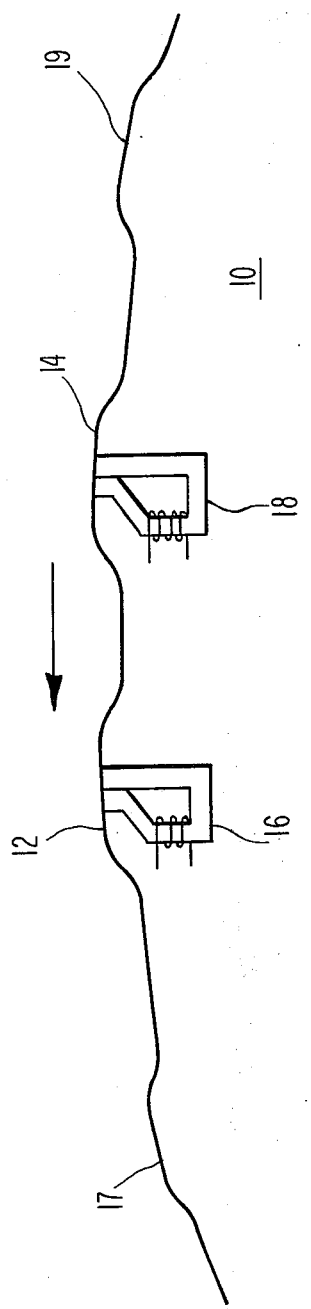
FIG. 1 represents a tape transducer head assembly of a generalized type.

Referring now to FIG. 1 there is shown in cross-sectional form a magnetic transducer recording head assembly 10 of a type which is commonly used in digital tape drive systems. With a system of the type contemplated "forward" tape travel is in a direction indicated by the arrow and is motivated by a drive capstan (not shown) located to the left of the illustrated head assembly.

The head assembly 10 is conventionally provided with a read head 12 and a write head 14. Within the read and write heads are disposed magnetic core assemblies 16 and 18, respectively. As is familiar to those skilled in the art the upper ends of each core assembly are isolated from the surrounding head material by segments of a conductive intermediate material, such as copper. A winding upon each core serves to inductively couple the core to appropriate read/write circuitry (not shown). A plurality of aligned core assemblies may be provided in a single head for sensing multiple tracks upon a single tape.

Each of the heads 12, 14 comprise a raised portion of the head assembly body material, which is configured to form a bearing surface over which a web or tape having a magnetic coating is transported. The surfaces of the read and write head assemblies are considered to form the central or inboard bearing surfaces of the illustrated head assembly.

Disposed at either side of the read and write heads are additional raised areas of the head assembly which comprise outboard bearings 17 and 19. A length of tape being transported across the head assembly is drawn or wrapped over the four bearing surfaces, the supplement of the included angle formed by the approaching and departing tape being termed the wrap angle.

Due to the relatively high velocity at which the tape is transported a hydrodynamic bearing effect is created inasmuch as the tape separates slightly from the head bearing surfaces. This separation is restrained to the range of 10 to 15 micro-inches by judicious design of the bearing surfaces. Designers of tape head assemblies have learned to provide the various head bearing surfaces with contours which will aid in producing a desired separation for given tape transport conditions. While a substantial amount of effort has been devoted to the analysis of the hydrodynamic properties of various transducer head contours, for instance as set forth in U.S. Pat. No. 3,821,813, the successful operation of a given head contour is not completely predictable and often its final development must proceed by trial and error.

Part of the difficulty in designing a satisfactory head contour is due to the varying speeds and accelerations which are undergone by the tape. For instance, with the assembly of FIG. 1 in one transport mode the tape is pulled across the head assembly at high speed by a capstan. The tape is thus under constant tension, both during acceleration and steady-state operation. When the tape direction is reversed, however, the tape must be rapidly accelerated in a left-to-right direction. In this mode the tape is actually pushed, rather than pulled, by the driving capstan such that the tape does not experience the same tensioning forces as in the former case.

It has been found that under reverse acceleration the tape tends to buckle upwardly between the first two bearing surfaces encountered, corresponding to bearings 17 and 12 in FIG. 1. While this phenomenon may have been acceptable to a degree in prior art equipment, recently developed high speed transport apparatus operating at substantially increased speeds require greatly increased acceleration rates in order to bring the tape up to speed in the requisite time.

Figure 2:
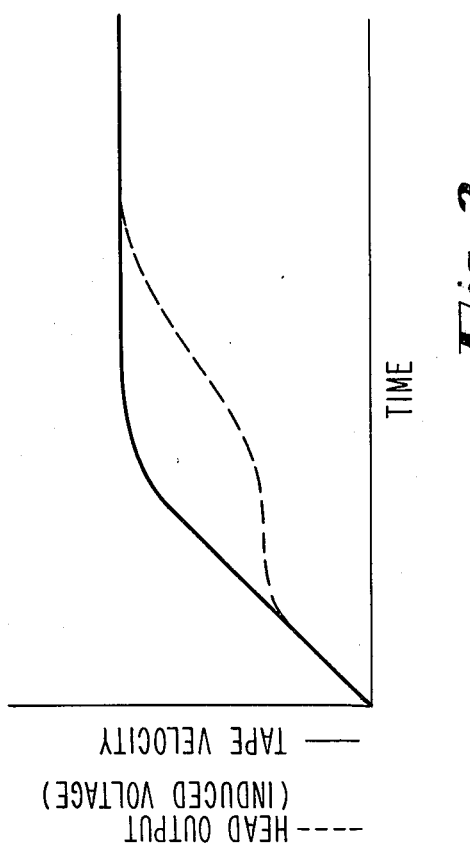
FIG. 2 shows the velocity of a transported tape, and the degree of coupling between the tape and a juxtaposed transducer, as a function of time.

FIG. 2 is a graphic representation of the voltage induced in a typical head by a magnetized area of a length of tape undergoing acceleration. As will be understood by those skilled in the art, the induced voltage in an inductive transducer provides a ready measure of the degree of inductive coupling between the magnetizable layer of the tape and the adjacent transducer. According to the familiar relationship $$20 \log \frac{V_1}{V_2} = \frac{54.6 \, (h_1 - h_2)}{\lambda}$$

where $V_1$ is head output at some head-to-tape separation $h_1$;

$V_2$ is head output at another head-to-tape separation $h_2$; and $\lambda$ is the distance between successive flux reversals it can be seen that head output decreases with the density of recorded data, and with increased head-to-tape separation.

The latter effect is responsible for the departure of a broken line, which represents induced voltage $e$ and thus the degree of coupling, from the solid line which represents tape velocity.

It will now be understood from an inspection of FIG. 2 that as the tape accelerates in a reverse direction, considered herein to be in a direction away from a drive capstan, the coupling between the tape and transducer declines drastically due to a sudden, increased separation between the tape and the transducer. As represented by the curves of FIG. 2 this increased separation, though transient, continues even after acceleration of the tape ceases and maximum velocity is attained.

During the period when the increased separation occurs it is difficult and often impossible for the inductive transducer and in the heads of digital tape transport equipment to detect all of the signals, which take the form of magnetic flux reversals in the tape coating. This is particularly true with respect to recently developed high density digital tape equipment in which it is possible to produce over 9000 flux reversals per inch. In such equipment even a brief period of undue tape separation can result in severe errors in machine operation. Further, such equipment typically requires a much smaller separation than previously and is therefore far more sensitive to instability of the hydrodynamic bearing.

While the presence of the above-described effect has been recognized and some theories advanced to explain it, the actual workability of a given contour can only be ascertained through experiment. In fact, most useful designs are arrived at through a process of trial and error.

In the case of the present invention it has been found impractical to attempt to define the contour of the superior head assembly produced in accordance with the teachings set forth herein. Rather, an initial unprocessed "as ground" contour will be set forth along with a sequence of steps which will render such subtle modifications in the contour as will cause it to be substantially impervious to increased separation between head assembly and tape during reverse acceleration.

Figure 3:
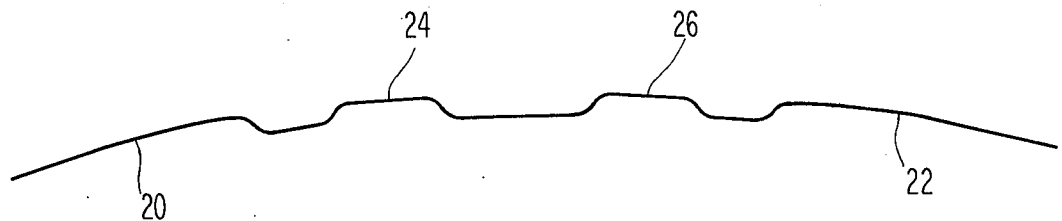
FIG. 3 is a cross-sectional illustration of contour of a magnetic head assembly formed in accordance with one aspect of the present invention.

Referring now to FIG. 3, there is shown a general outline of a head assembly surface of the type with which the present invention is concerned.

It will be noted that the outboard ones of the bearing surfaces 20 and 22 have elongate ramps extending from opposite sides thereof. The ramps assist in setting up the desired hydrodynamic bearing effect upon the outboard bearings. A pair of inboard bearing surfaces 24, 26 are also provided and defined by three depressions as is the case with certain of the prior art designs.

Figure 4:
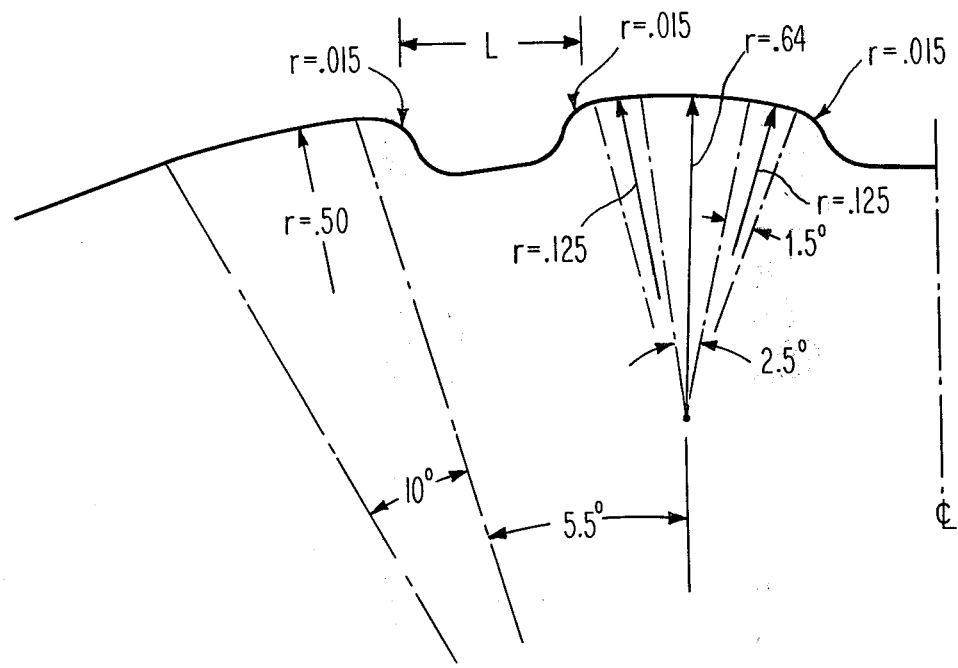
FIG. 4 is an enlarged view of a section of the contour shown in FIG. 3.

An enlarged view of a head assembly contour of the type illustrated in FIG. 3 is shown in FIG. 4. As it is assumed that the assembly is substantially symmetrical it is necessary only to show one half. At this juncture it is important to note that the head contour of FIG. 4 is a semifinished or as ground contour. As will be set forth hereinafter the as ground configuration must be finished by a lapping procedure in order to achieve the contour necessary for proper operation.

Outboard bearing 20 terminates at its inner end in a small radius. In operation, it has been found that a radius no greater than 0.015 inch is desirable. The outermost surface of the bearing, termed a ramp, may be planar or may have a large radius, the specific configuration of the ramp not being critical to the operation of the inventive head assembly. Between the small inner radius and the ramp of each outer bearing is an intermediate arcuate portion having a radius of approximately ½ inch. The ramp area and the small, inner radiused surface are both tangent to the intermediate portion so that the surface formed thereby is smooth and presents no abrupt changes.

The inboard bearings are formed as is shown by bearing 24. The outer shoulders of each inboard bearing are relatively sharp, having radii of 0.015 inch or less. The central portion of the bearing is generated by a radius about an axis located along the centerline of the bearing. The radius of the central area is relatively large, and shoud be in the range of 0.5 to 0.7 inches. In a successfully tested embodiment a radius of 0.64 inches was found to be optimal, the radiused surface subtending an arc of 2.5° as shown in the figure.

On either side of the large, central area are second arcuate surfaces generated by radii of approximately 0.1 to 0.18 inches. In the successfully implemented embodiment referred to above a radius of 0.125 inch was selected, the surfaces then produced subtending arcs of 1.5° as shown.

It should be understood that adjacent arcuate surfaces of the bearings are contiguous and form a smooth, continuous surface. This may be accomplished by locating the axes of the various surfaces so that the arcs they describe are tangent to their neighbors.

The distance L between the "trailing" inboard and outboard bearings is of great importance. The bearings described are those which are last encountered by a length of tape being transported in a forward direction. The length of distance L determines the beam stiffness of the tape extending between the bearings. The stiffer the tape beam (lesser dimension L) the less the tape will buckle. Dimension L should be small enough so that upon reverse acceleration the tape will continue to approach the inboard bearing surface in the region of the smaller radius. Typically, this means that the point of contact cannot be allowed to shift more than 0.1° on the arcuate surface during reverse acceleration.

For typical ½ inch wide, 0.0015 inch thick polyester backed tape operated under a tension of from 0.75 to 1.3 pounds per inch, the distance L should not exceed 0.030 inches. In addition, dimension L must be at least 0.007 inches or more in order to allow the desired hydrodynamic bearing effects.

The foregoing as ground configuration may be produced in a head assembly by appropriate machining techniques, such as grinding with a formed wheel. While such a process produces fairly smooth surfaces, it is often necessary to blend or smooth the as ground surface by a lapping procedure. In addition, it is usually necessary to form a hardened surface upon the bearings. Hardening methods such as chrome plating are well known, and will not be described in detail herein as they do not relate to the subject matter of the present invention.

The proper finishing of the as ground configuration described above comprises an integral and very important aspect of the present invention. The surfaces are finished by a lapping procedure using a lapping tape whose pliability approximates that of the magnetic tape which is to be used with the completed head assembly. In one procedure, successful results were obtained using a lapping tape manufactured by the Minnesota Mining and Manufacturing Corp. and designed 3M Imperial Lapping Film. The material selected utilized 3 micron silicon carbide abrasive disposed in a relatively soft organic binder. The tape backing comprised a polyester web.

The lapping tape was wrapped over the head bearing surfaces in the same manner as the magnetic tape to be used and is tensioned in the same degree, approximately 90% of the lowest tension to be encountered during tape transport activities. The lapping tapes were then transported over the as ground head assembly as follows:

1. 1 pass new tape
2. 3 passes used tape
3. 1 pass new tape

As certain lapping tape characteristics, particularly the coarseness of the abrasive surface, change as the tape is used it as been necessary to differentiate between "new" and "used" lapping tape. For present purposes new tape may be defined as tape which has been used for 5 passes or less, and used tape as that which has experienced over 5 passes. It should be understood, however, that since the newness characteristic eludes strict definitional terms and due to variation in characteristics between various lapping tapes the present invention ought not be rigidly restricted to the 0 to 5 pass-and-over 5 pass dichotomy recited herein.

Further, for present purposes it has been found useful to define a pass as a traversal of the lapping tape in a forward direction at approximately 200 inches per second (ips) and in a reverse direction at 600 ips. The length of tape thus transported is usually 1800 feet since this is the length in which lapping tapes are generally sold. It is believed, however, that passes of approximately 1500 to 2000 feet of tape will produce acceptable results.

As set forth above, the changes which are wrought in the head contours by the described lapping procedure are so subtle that available instrumentation is inadequate for properly identifying either the changes, or the final contour achieved. It is believed that the described lapping method operates in conjunction with the as ground surface to maintain a generous radius upon the trailing side of the second inboard bearing encountered by a forward-running tape. It is this surface which first encounters the tape when it is traveling in the reverse direction.

When the direction of the tape is abruptly reversed the portion of the tape bridging the first outboard and inboard bearings bulges slightly outward so that the point at which the tape first meets the inboard head moves inwardly toward the center of the head. It is believed that the novel head assembly produced by the above-described technique allows the head contour which is normally first encountered by the tape to be extended further inwardly upon the head surface. This in turn creates an entrance configuration which militates against an unstable tape-to-head gap and allows consistently accurate information transfer between the tape and head immediately after reverse direction acceleration of the tape has begun.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

I claim:

1. The method of forming the working surface of a transducer head assembly for receiving a transported magnetic tape, comprising the steps of:
   grinding the working surface to form three depressions extending across the head assembly transverse to the direction of tape travel to define four upstanding bearing areas,
   the outer two of said bearing areas each comprising a arcuate surface having a radius of no greater than substantially 0.015 inch substantially tangent to the outer edge of ones of said depressions, a second arcuate surface having a radius of substantially 0.5 inch contiguous with said first arcuate surface, and an elongate ramp-like surface extending from said second arcuate surface;
   the inner two of said bearing areas each having core means generally centrally located therein for interacting with magnetized areas on said tape;
   the inner two of said bearing areas each comprising a first generally central arcuate surface having a radius of from 0.5 to 0.75 inches, second arcuate surfaces contiguous with said first surface and having radii of substantially from 0.1 to 0.2 inches, and third generally arcuate surfaces contiguous with said second surfaces and having radii of up to 0.015 inch;
   abrading said arcuate surfaces of said bearing areas with an elongate web having an abrasive surface and oriented in substantially the same position as a tape to be transported by the steps of:
   placing said web under a tension of substantially 90% of the lowest tension to be encountered by said tape during a drive cycle;
   i. passing a new length of said web over said bearing surfaces in a forward tape transport direction at approximately 200 ips and in a reverse tape transport direction at approximately 600 ips;
   ii. passing a used length of said web over said bearing surfaces in a forward tape transport direction at approximately 200 ips and in a reverse tape transport direction at approximately 600 ips;
   iii. repeating step (ii) twice; and
   iv. repeating step (i) once.

2. A transducer head assembly for interacting with magnetizable areas upon a length of magnetic tape to be transported thereacross in a forward and a reverse direction and having a working surface produced by the steps of:
   forming a working surface upon the head assembly having at least three depressions extending in a direction transverse to the direction of travel of the magnetic tape to define four bearing areas;
   the outer two of said bearing areas each terminating at the inward end thereof in an edge having a radius no greater than 0.015 inch, terminating at the outward end thereof in an elongate ramp-like surface, and having an arcuate surface extending between said edge and said ramp-like surface;
   the inner two of said bearing areas each terminating at either end thereof in edges having radii no greater than 0.015 inch, having a central arcuate surface having a radius in the range of approximately 0.5 to 0.7 inches, and a pair of lesser arcuate surfaces extending between the ends of said central arcuate surface and said edges and having radii in the range of approximately 0.1 to 0.2 inches; and
   abrading said working surface by passing thereover a length of approximately 1500 to 2000 feet of abrasive tape at approximately 200 ips in a forward tape transport direction and at approximately 600 ips in reverse tape transport direction, said abrading to be conducted once with new tape, three times with used tape and once again with new tape.

3. The transducer head assembly defined in claim 2, wherein adjacent ones of said arcuate surfaces are continuous.

4. The transducer head assembly defined in claim 3, wherein adjacent ones of said arcuate surfaces are tangent.

5. The transducer head assembly as defined in claim 4, wherein said abrasive tape is placed under a tension which is approximately 90% of that of a magnetic tape to be transported.

6. A transducer head assembly as defined in claim 5 wherein the gap between the inboard and outboard bearing surfaces last encountered by a tape transported in a forward direction is broad enough to support a hydrodynamic bearing action by the inboard bearing and is sufficiently narrow to prevent the point of tangency of said tape and said inboard bearing surface from shifting substantially when said tape is subjected to reverse acceleration.

7. A transducer head assembly according to claim 6 wherein said point of tangency is prevented from shifting by more than 0.1°.

8. A transducer head assembly according to claim 7 wherein said gap is between 0.007 inches and 0.030 inches in length.

9. The method of forming the working surface of a transducer head assembly for hydrodynamically supporting a transported magnetic tape thereon, comprising the steps of:

grinding the working surface to form at least three depressions extending transverse to the direction of tape travel and defining four upstanding bearing areas;

the outer two of said bearing areas each terminating at the inner end thereof in an edge having a radius of no more than 0.015 inch, terminating at the outer edge thereof in an elongate ramp-like surface, and having intermediate said ends an arcuate surface having a radius of approximately ½ inch;

the inner two of said bearing areas each being adapted to receive a plurality of core means for interacting with magnetized areas upon length of tape transported over said bearing areas;

the inner two of said bearing areas each terminating in edges having radii of no more than 0.015 inch, having a central, arcuate surface generated by a radius of from substantially 0.5 to 0.75 inches and a pair of lesser arcuate surfaces disposed at either end of said central arcuate surface having radii of substantially from 0.1 to 0.2 inches;

abrading said bearing areas with a length of abrasive tape oriented in substantially the same position as a magnetic tape to be transported, by sequentially subjecting the ground working surface to a single pass of new tape, three passes of used tape, and another single pass of new tape; and each of said passes comprising transporting a length of approximately 1500 to 2000 feet of said abrasive tape over said working surface at approximately 200 ips in a forward tape transport direction, and at approximately 600 ips in a reverse transport tape direction.

10. The method set forth in claim 9, further including the step of:

placing the abrasive tape under a tension of approximately 90% of the lowest tension to be encountered by magnetic tape during the transport thereof.

11. The method defined in claim 10, wherein the depression between the inboard and outboard bearing surfaces last encountered by a tape transported in a forward direction is of sufficient breadth to support a hydrodynamic bearing action by the inboard bearing surface, and sufficently narrow to prevent the point of tangency between a transported tape and said inboard bearing surface from shifting substantially when said tape is subjected to reverse acceleration.

12. The method defined in claim 11, wherein said point of tangency is prevented from shifting by more than 0.1°.

13. The method defined in claim 12 wherein the abrasive tape comprises an abrasive surface of 3 micron silicone carbide particles.

* * * * *